(12) United States Patent
Ishida

(10) Patent No.: US 10,643,656 B2
(45) Date of Patent: May 5, 2020

(54) PRINTING APPARATUS, METHOD OF CONTROLLING PRINTING APPARATUS, AND NON-TRANSITORY RECORDING MEDIUM CONTAINING COMPUTER-READABLE INSTRUCTIONS THEREFOR

(71) Applicant: BROTHER KOGYO KABUSHIKI KAISHA, Nagoya, Aichi (JP)

(72) Inventor: Minako Ishida, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 216 days.

(21) Appl. No.: 15/713,906

(22) Filed: Sep. 25, 2017

(65) Prior Publication Data

US 2018/0218754 A1 Aug. 2, 2018

(30) Foreign Application Priority Data

Jan. 31, 2017 (JP) .................................. 2017-015730

(51) Int. Cl.
*G11B 20/00* (2006.01)
*G06F 21/62* (2013.01)
(Continued)

(52) U.S. Cl.
CPC .... *G11B 20/00086* (2013.01); *G06F 21/6245* (2013.01); *G11B 20/00152* (2013.01);
(Continued)

(58) Field of Classification Search
CPC .............. G11B 20/00086; G11B 27/34; G11B 20/00152; G06F 21/6245; G06F 3/04817;
(Continued)

(56) References Cited

U.S. PATENT DOCUMENTS 7,362,464 B2 * 4/2008 Kitazawa ................ G06K 15/00
345/522
2007/0013950 A1 * 1/2007 Kajihara ................ G06K 1/121
358/1.18

(Continued)

FOREIGN PATENT DOCUMENTS

JP H05-284306 A 10/1993
JP H11-65784 A 3/1999
(Continued)

*Primary Examiner* — David H Banh
(74) *Attorney, Agent, or Firm* — Scully, Scott, Murphy & Presser, P.C.

(57) ABSTRACT

A printing apparatus includes a printer configured to print a character on a printing medium, a display including multiple individual display areas arranged in a particular order, and a controller. The controller is configured to display one of a character image and an icon on each of the multiple individual display areas, the character image being an image indicating the character, the icon corresponding to a control code indicating a process related to a print control of the character, and control printing performed by the printer based on a target code and a target character, the target code being a control code corresponding to the icons displayed in the individual display areas, the target characters being characters indicated by the character images displayed in the individual display areas.

6 Claims, 13 Drawing Sheets

(51) Int. Cl.
*H04N 1/00* (2006.01)
*G11B 27/34* (2006.01)
*G06F 3/0481* (2013.01)
*G06F 3/0482* (2013.01)

(52) U.S. Cl.
CPC ............. *H04N 1/00* (2013.01); *H04N 1/0035* (2013.01); *H04N 1/00405* (2013.01); *H04N 1/00442* (2013.01); *G06F 3/0482* (2013.01); *G06F 3/04817* (2013.01); *G11B 27/34* (2013.01)

(58) Field of Classification Search
CPC .... G06F 3/0482; H04N 1/00; H04N 1/00405; H04N 1/0035; H04N 1/00442
See application file for complete search history.

(56) References Cited

U.S. PATENT DOCUMENTS

| | | | |
|---|---|---|---|
| 2007/0187508 A1* | 8/2007 | Takayama | G06K 19/06037 235/462.01 |
| 2008/0074697 A1* | 3/2008 | Sawada | B41J 3/01 358/1.15 |
| 2010/0021131 A1 | 1/2010 | Bonnan | |
| 2010/0328714 A1* | 12/2010 | Allen | G06F 3/04847 358/1.15 |
| 2013/0007657 A1* | 1/2013 | Gammill | G06F 3/04817 715/810 |
| 2013/0148142 A1* | 6/2013 | Kido | G06K 15/024 358/1.11 |
| 2014/0139881 A1* | 5/2014 | Moriyama | G07G 5/00 358/1.18 |
| 2014/0285827 A1* | 9/2014 | Kuronuma | G06F 3/048 358/1.6 |
| 2015/0331588 A1* | 11/2015 | Ishida | G06F 3/04812 715/765 |
| 2017/0147168 A1* | 5/2017 | Yamanishi | H04N 1/00448 |
| 2017/0185247 A1* | 6/2017 | Yamaoka | G06F 3/0482 |
| 2018/0218754 A1* | 8/2018 | Ishida | G11B 20/00086 |

FOREIGN PATENT DOCUMENTS

| | | |
|---|---|---|
| JP | 2009-517797 A | 4/2009 |
| JP | 2014-13964 A | 1/2014 |
| JP | 2014-205251 A | 10/2014 |

* cited by examiner

FIRST CONCRETE EXAMPLE

PRINTING APPARATUS, METHOD OF CONTROLLING PRINTING APPARATUS, AND NON-TRANSITORY RECORDING MEDIUM CONTAINING COMPUTER-READABLE INSTRUCTIONS THEREFOR

CROSS-REFERENCE TO RELATED APPLICATIONS

This application claims priority under 35 U.S.C. § 119 from Japanese Patent Application No. 2017-015730 filed on Jan. 31, 2017. The entire subject matter of the application is incorporated herein by reference.

BACKGROUND

Technical Field

The present disclosures relate to a printing apparatus, a method of controlling a printing apparatus, and a non-transitory recording medium containing computer-readable instructions for controlling a printing apparatus.

Related Art

Conventionally, there has been known a printing apparatus which is provided with a display configured to display characters to be printed on a printing medium, and a user is allowed to set a process related to a print control of such characters. For example, there has been known a tape printer which has a display. On the display, a printing subject (i.e., image data including characters to be printed) is displayed as a selection screen. The user may be allowed to designate the number of pieces of image data to be created, and the designated number is displayed on a number-of-page designating screen.

SUMMARY

According to the conventional printing apparatus as mentioned above, in order to check the number of pieces of image data to be created, the user is required to browse the page number designating screen, which is different from the selection screen on which the image data is displayed. Therefore, it is difficult for the user to recognize a process regarding the print control (e.g., the number of pieces of image data to be created) with monitoring the printing subject (i.e., the characters subject to be printed). It might be possible to configure the printing apparatus such that the selection screen and the number-of-page designating screen are integrated into one display screen of the tape printer. However, in order to employ such a configuration, a relatively large displaying area to include both the selection screen and the number-of-page designating screen becomes necessary, and upsizing of the display of the tape printer becomes necessary.

According to aspects of the disclosures, there is provided a printing apparatus, which includes a printer configured to print a character on a printing medium, a display including multiple individual display areas arranged in a particular order, and a controller. The controller is configured to display one of a character image and an icon on each of the multiple individual display areas, the character image being an image indicating the character, the icon corresponding to a control code indicating a process related to a print control of the character, and control printing performed by the printer based on a target code and a target character, the target code being a control code corresponding to the icons displayed in the individual display areas, the target characters being characters indicated by the character images displayed in the individual display areas.

According to aspects of the disclosures, there is provided a non-transitory recording medium for a printing apparatus having a printer configured to print a character on a printing medium, a display including multiple individual display areas arranged in a particular order and a controller. The recording medium stores computer-readable instructions which cause, when executed by the controller, the printing apparatus to display one of a character image and an icon on each of the multiple individual display areas, the character image being an image indicating the character, the icon corresponding to a control code indicating a process related to a print control of the character, and control printing performed by the printer based on a target code and a target character, the target code being a control code corresponding to the icons displayed in the individual display areas, the target characters being characters indicated by the character images displayed in the individual display areas.

According to aspects of the disclosures, there is provided a method of controlling a printing apparatus, the printing apparatus including a printer configured to print a character on a printing medium, a display including multiple individual display areas arranged in a particular order. The method includes displaying one of a character image and an icon on each of the multiple individual display areas, the character image being an image indicating the character, the icon corresponding to a control code indicating a process related to a print control of the character, and controlling printing performed by the printer based on a target code and a target character, the target code being a control code corresponding to the icons displayed in the individual display areas, the target characters being characters indicated by the character images displayed in the individual display areas.

BRIEF DESCRIPTION OF THE ACCOMPANYING DRAWINGS

DESCRIPTION OF THE EMBODIMENTS

Hereinafter, referring to the accompanying drawings, a first illustrative embodiment according to the disclosures will be described. A printing apparatus 1 is configured to create print data. Further, the printing apparatus 1 is a label printer configured to print characters (e.g., letters, symbols, numerals, figures, pictographs and the like) on a tape 50, which serves as a printing medium, based on the created print data. According to the illustrative embodiment, the tape 50 is of non-thermosensitive receptor type, and has multiple layers including a release sheet layer and a label sheet layer.

In the following description, an upper right side, a lower left side, a lower right side, an upper left side, an upper side, and a lower side of FIG. 1 will be referred to as a rear side, a front side, a right side, a left side, an upside and a downside of the printing apparatus 1, respectively (see arrows in FIGS. 1 and 2).

Figure 1:
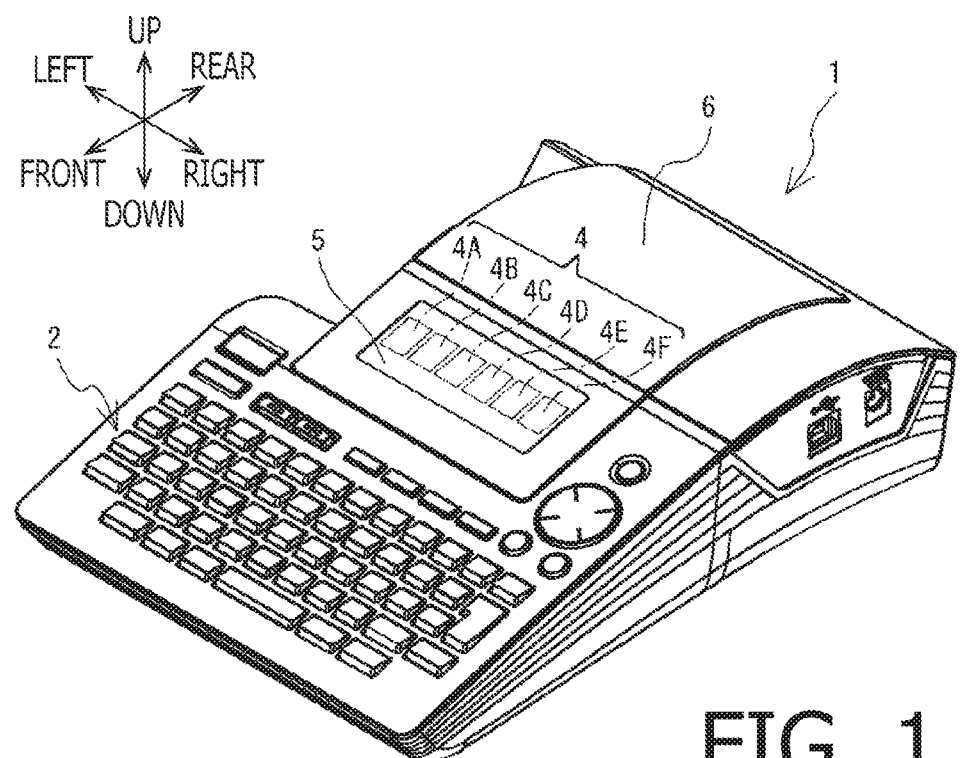
FIG. 1 is a perspective view of a printing apparatus according to an illustrative embodiment of the present disclosures with its cover being closed.
Figure 2:
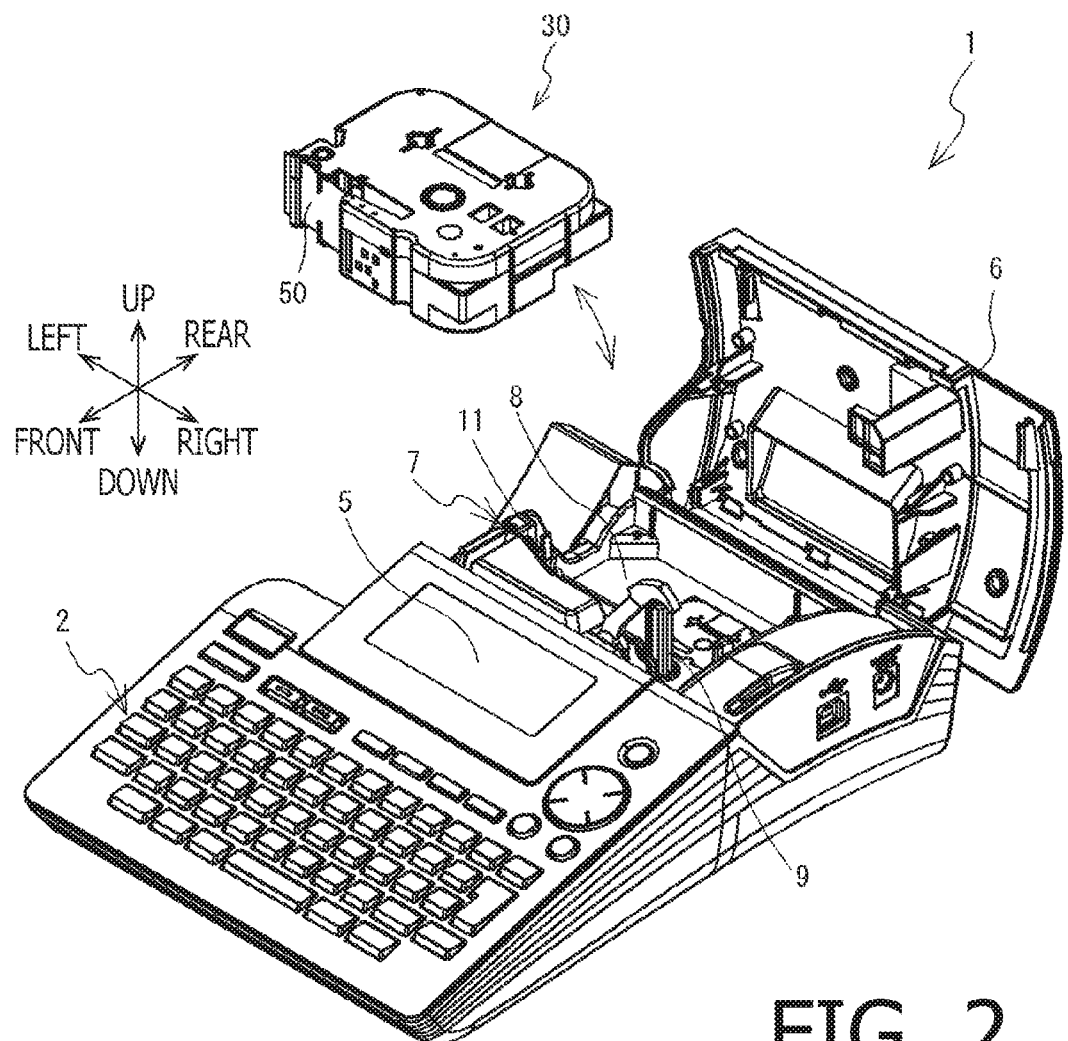
FIG. 2 is a perspective view of the printing apparatus with its cover being opened, and a tape cassette.

Referring to FIGS. 1 and 2, a mechanical configuration of the printing apparatus 1 will be described. As shown in FIG. 1, an operation panel 2 is provided to a front part of an upper surface of the printing apparatus 1. The operation panel 2 includes a keyboard for inputting characters, a power switch, function keys and cursor keys. On a rear side of the operation panel 2, a display 5 is provided. The display 5 has a plurality of individual display areas 4A-4F which are aligned, from left to right, in a row. It is noted that, in the following description, the individual display area 4A (4B, 4C and 4D) will be referred to as an individual display area 4 when a particular individual display area 4A (4B, 4C and/or 4D) is not specified. In each individual display area 4, one of a character image indicating a character or an icon corresponding to a control code (described later) is displayed. Further, on a rear end part of the upper surface of the printing apparatus 1, an openable/closeable cover 6 is provided.

As shown in FIG. 2, inside the printing apparatus 1, a mounting part 8 is formed on the rear side of the display 5. The mounting part 8 is a recessed part which is formed to correspond to an outer shape of the tape cassette 30. The tape cassette 40 is detachably mounted to the mounting part 8.

The tape cassette 30 has a cassette case having a substantially cuboid shape. Inside the cassette case, a tape 50 on which characters are printed, an ink ribbon used for printing the characters on the tape 50 and the like are accommodated. The printing apparatus 1 is configured such that, with use of the tape cassette 30 mounted on the mounting part 8, printing of characters, which are input through the operation panel 2, is performed.

Figure 3:
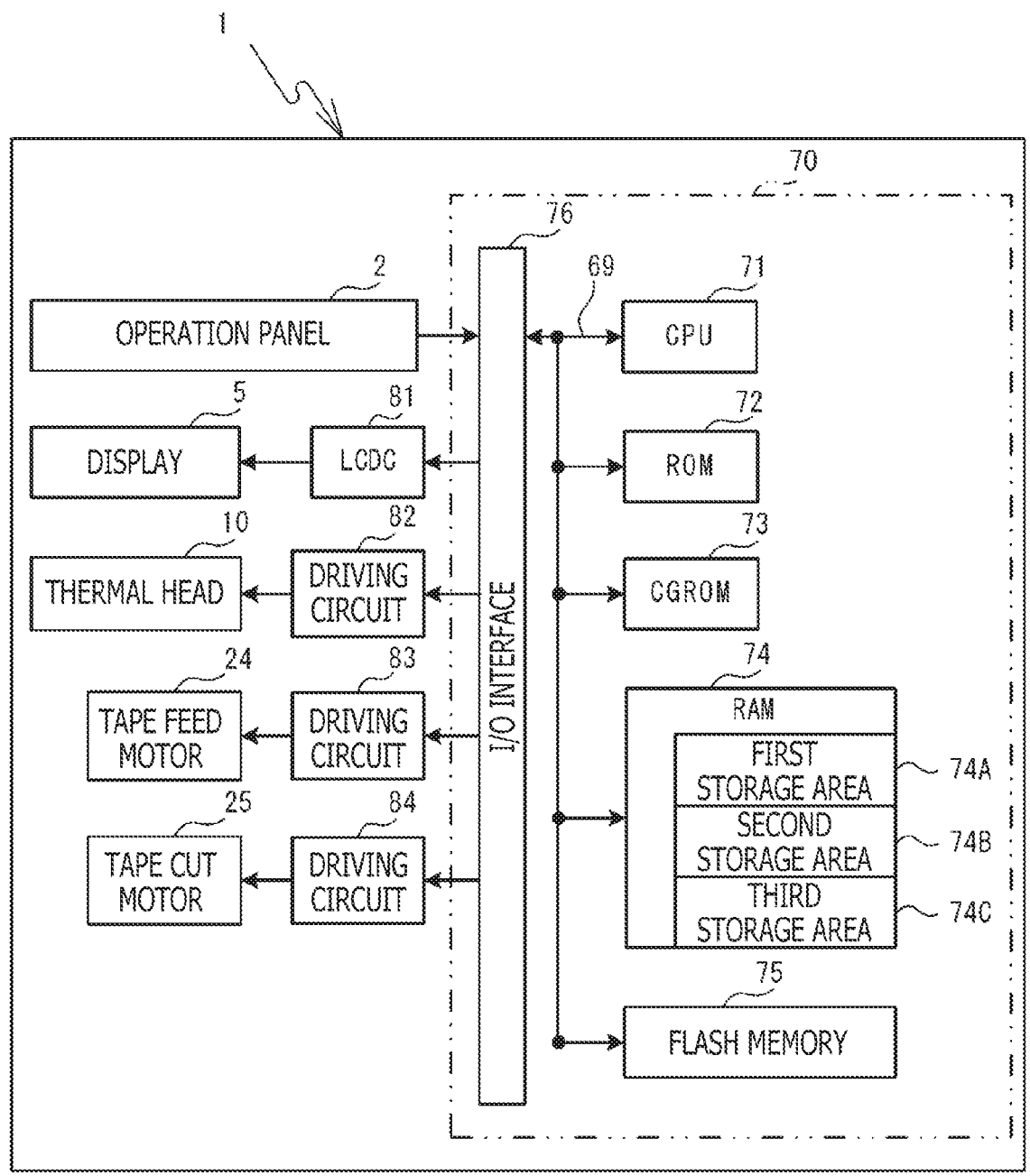
FIG. 3 is a block diagram showing an electrical configuration of the printing apparatus shown in FIG. 1.

The mounting part 8 has a tape driving shaft 11, a ribbon winding shaft 9 and a thermal head 10 (see FIG. 3). The tape driving shaft 11 serves to feed the tape 50 as driven by the tape feed motor 24 (see FIG. 3). The ribbon winding shaft 9 winds a used part of the ink ribbon as driven by the tape feed motor 24. The thermal head 10 prints characters on the fed tape 50 using an unused part of the ink ribbon. On a downstream side, in a feeding direction of the tape 50, with respect the thermal head 10, a cutter 7 is provided. The cutter 7 is driven by the cut motor 25 (see FIG. 3) to cut a printed part of the tape 50 at a particular position. The cutter 7 is configured to execute a half-cut operation and a full-cut operation. In the half-cut operation, the cutter 7 cuts a part of (i.e., particular ones) of multiple layers constituting the tape 50. In the full-cut operation, the cutter 7 cuts all the layers of the tape 50.

Referring to FIG. 3, an electrical configuration of the printing apparatus 1 will be described. The printing apparatus 1 has a controller 70. The controller 70 is formed on a control substrate (not shown). The controller 70 includes a CPU 71, a ROM 72, a CGROM 73, a RAM 74, a flash memory 75 and an I/O interface 76, which are interconnected through a data bus 69.

The CPU 71 is configured to control an entire operation of the printing apparatus 1. The ROM 72 is configured to store parameters which are necessary when the CPU 71 executes various programs. The CGROM 73 is configured to store printing dot patters for printing characters. The RAM 74 includes multiple storage areas such as a text memory, a printing buffer and the like for temporarily storing various pieces of data. The RAM 74 according to the illustrative embodiment includes a first storage area 74A, a second storage area 74B and a third storage area 74C. The flash memory 75 is configured to store various programs which the CPU 71 executes for controlling the printing apparatus 1.

The I/O interface 76 is connected with the operation panel 2, an LCDC (liquid crystal driving circuit) 81, driving circuits 82, 83 and 84. The LCDC 81 has a video RAM (not shown) for outputting display data to the display 5. The driving circuit 82 is an electronic circuit for driving the thermal head 10. The driving circuit 83 is an electronic circuit for driving the tape feed motor 24. The driving circuit 84 is an electronic circuit for driving the cut motor 25.

A case where a user creates the print data will be described. The printing apparatus 1 is configured such that, when print data is created, control codes related to print controlling of characters can be set. According to the illustrative embodiment, as control codes, a copy code, a numbering code and a cut code are available.

The copy code indicates a copying process in which the printing apparatus 1 is caused to execute a printing operation, on a unit basis (hereinafter, referred to as a unit printing), repeatedly by a particular number of times in accordance with a particular number of copying operations, where the "unit" includes a particular number of characters. For example, when the number of executions of copying is set to three (3) and a character "1" is printed in accordance with the copying process, the characters "1", "1" and "1" are printed (i.e., the character "1" is printed three times).

The numbering code indicates a numbering process in which counting-up of a character according to a particular arrangement order is executed, and printing of the character subjected to the count-up is executed in accordance with a particular number of times of numbering operations. For example, when the number of executions of the numbering is "3" and the character "1" is printed in accordance with the numbering process, character "1", and counted up characters "2" and "3" are printed.

The cut code indicates a cutting process causing the printing apparatus 1 to cut at least a part of the tape 50.

When the user operates the operation panel 2 to input control codes and/or characters, icon(s) corresponding to the input control code(s), and/or character image(s) indicating the input character(s) are displayed in the individual display areas 4, from left to right (i.e., in the individual display areas 4A, 4B, . . . ). In the following description, the control code corresponding to the icon displayed in the individual displaying area 4 will be referred to as a target code, and characters indicated by the character image displayed in the individual displaying area 4 will be referred to as a target character. When creation of the print data has been completed, the user operates the operation panel 2 to input a print start instruction to start printing to the CPU 71.

Hereinafter, referring to FIGS. 4-14, a main process will be described. When the user selects a screen to create the print data by operating the operation panel 2, the CPU 71 executes the main process based on a program stored in the flash memory 75. Specifically, the user sequentially inputs characters, which are printing subjects, and control codes to the CPU 71 by operating the operation panel 2 to generates the print data. When generation of the print data has been completed, the user inputs the print start instruction to the CPU 71 by operating the operation panel 2. Hereinafter, various pieces of information (e.g., the characters, control codes and the print start instruction) which are input through the operation panel 2 will be collectively referred to as input information.

Figure 4:
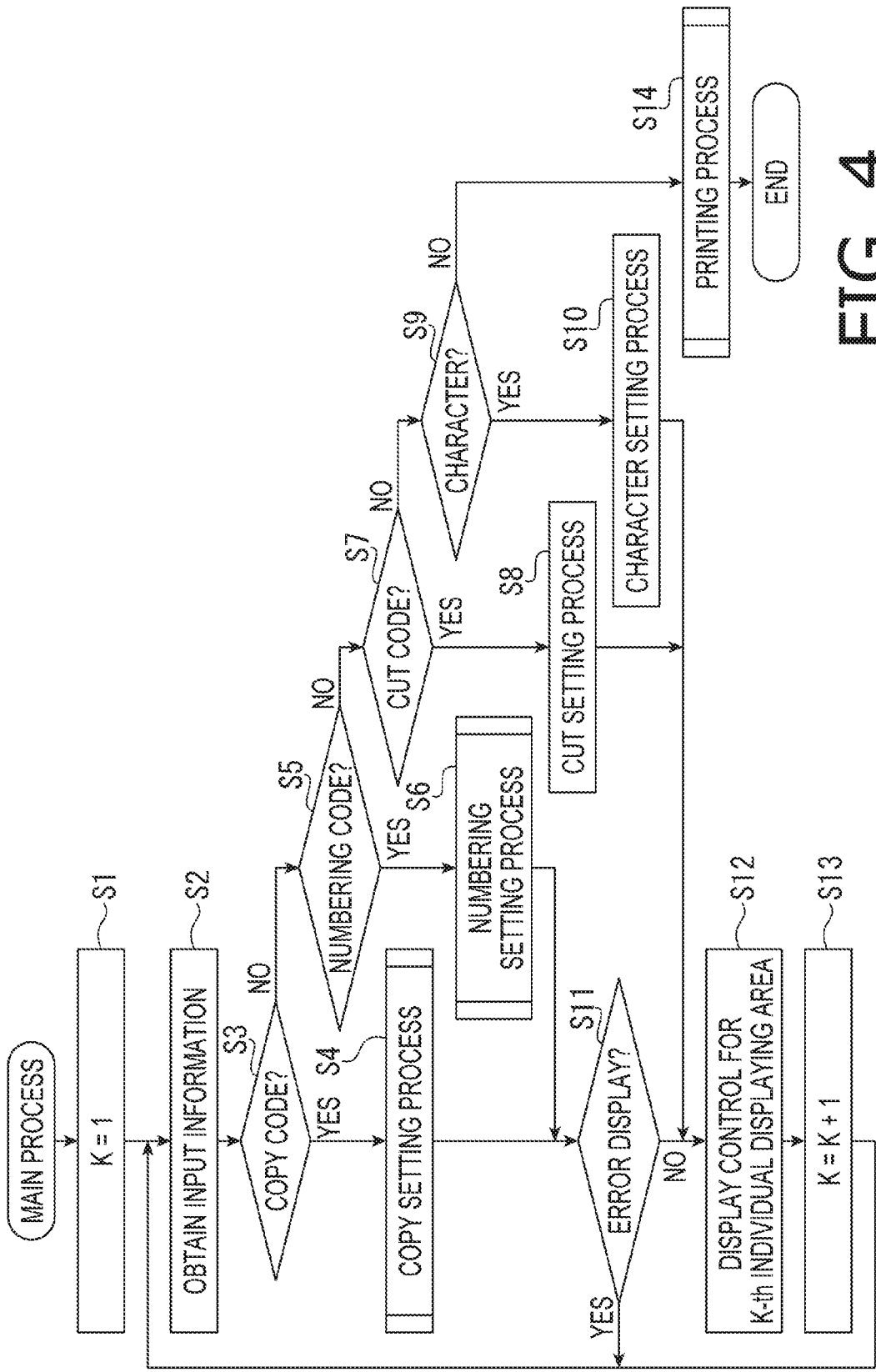
FIG. 4 is a flowchart showing a main process executed by a CPU of the printing apparatus.

As shown in FIG. 4, the CPU 71 sets a value K of a display counter to "1" (S1). The display counter is stored in the first storage area 74A. The value K of the display counter indicates the order of the individual display areas 4 from the left. Specifically, values "1", "2", "3" . . . indicate the individual display areas 4A, 4B, 4C . . . , respectively (see FIG. 1). In S2, the CPU 71 obtains the input information. Then, the CPU 71 determines whether the input information obtained in S2 represents a copy code (S3). When it is determined that the input information obtained in S2 is the copy code (S3: YES), the CPU 71 executes a copy setting process (S4), and advances the process to S11.

Figure 5:
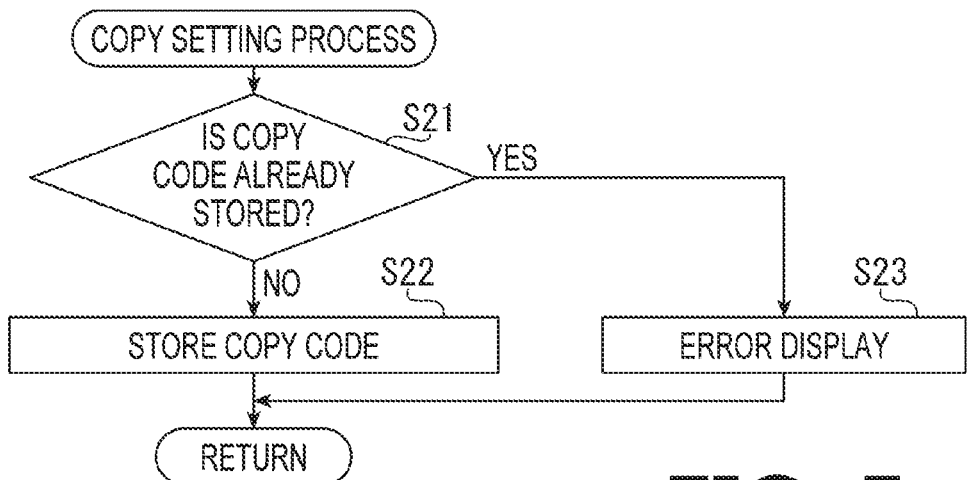
FIG. 5 is a flowchart showing a copy setting process executed by the CPU of the printing apparatus.

Referring to FIG. 5, the copy setting process will be described. In this process, the CPU 71 determines whether the copy code has been stored in the first storage area 74A (S21). When it is determined that the copy code has not been stored in the first storage area 74A (S21: NO), the CPU 71 stores the copy code in the first storage area 74A (S22), and returns the process to the main process (see FIG. 4). It is noted that, according to the embodiment, the copy code includes data designating the number of executions of copying. When it is determined that the copy code has already been stored in the first storage area 74A (S21: YES), the CPU 71 displays an error message indicating that a plurality of copy codes cannot be set to one piece of print data (S23), and returns the process to the main process (FIG. 4).

As shown in FIG. 4, when it is determined that the input information obtained in S2 is not the copy code (S3: NO), the CPU 71 determines whether the input information obtained in S2 is the numbering code (S5). When it is determined that the input information obtained in S2 is the numbering code (S5: YES), the CPU 71 executes a numbering setting process (S6), and advances the process to S11.

Figure 6:
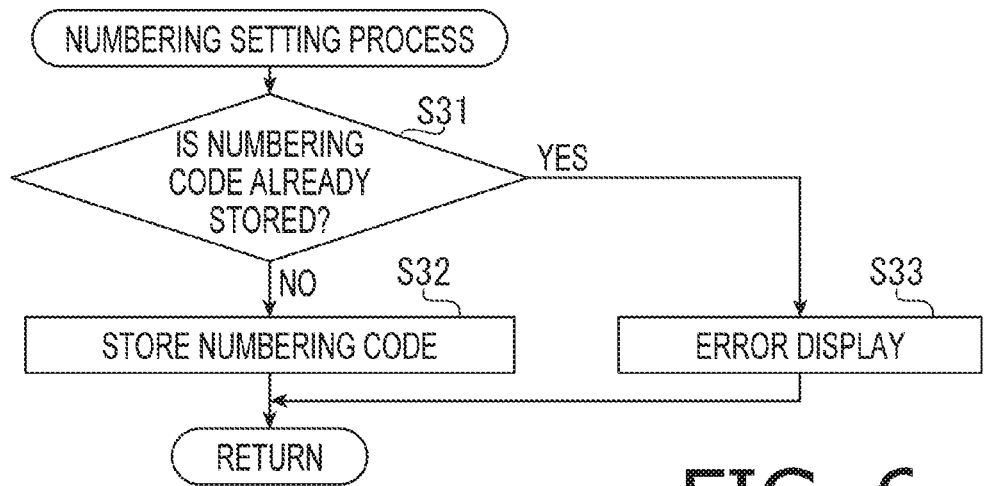
FIG. 6 is a flowchart showing a numbering process executed by the CPU of the printing apparatus.

Referring to FIG. 6, the numbering setting process will be described. The CPU 71 determines whether the numbering code has been stored in the first storage area 74A (S31). When it is determined that the numbering code has not been stored in the first storage area 74A (S31: NO), the CPU 71 stores the numbering code in the first storage area 74A (S32), and returns the process to the main process (FIG. 4). According to the embodiment, the numbering code includes data designating the number of executions of numbering. When it is determined that the numbering code has been stored in the first storage area 74A (S31: YES), the CPU 71 displays an error message indicating that a plurality of numbering codes cannot be set to one piece of print data (S33), and returns the process to the main process.

As shown in FIG. 4, when it is determined that the input information obtained in S2 is not the numbering code (S5: NO), the CPU 71 determines whether the input information obtained in S2 is the cut code (S7). When it is determined that the input information obtained in S2 is the cut code (S7: YES), the CPU 71 executes a cut setting process (S8), and advances the process to S12. In the cut setting process, the cut code is stored in the first storage area 74A. According to the embodiment, the cut code includes data designating a type of cutting operation (i.e., a half-cut operation or a full-cut operation).

When it is determined that the input information obtained in S2 is not the cut code (S7: NO), the CPU 71 determines whether the input information obtained in S2 is a character (S9). When it is determined that the input information obtained in S2 is the character (S9: YES), the CPU 71 executes a character setting process (S10), and advances the process to S12. In the character setting process, the obtained characters are stored in the first storage area 74A.

After execution of S4 or S6, the CPU 71 determines whether the error message is being displayed (S11). When it is determined that the error message is being displayed (S11: YES), the CPU 71 returns the process to S2. When it is determined that the error message is not being displayed (S11: NO), or after execution of S8 or S10, the CPU 71 executes display control of the individual display area identified by the value K of the display counter (i.e., the K-th individual display area 4 from the left side end) (S12). Specifically, an icon corresponding to the control code stored in the first storage area 74A in S22, S32 or S8, or an image showing the character stored in the first storage area 74A in S10 is displayed in the K-th (from the left end) individual display area 4.

In S13, the CPU 71 adds one "1" to the value K of the display counter, and the CPU 71 returns the process to S2. With this control, one of the character image or the icon is displayed in each of the individual display areas 4A, 4B, 4C . . . sequentially, based on the character/the control code obtained in S2.

Figure 7A:
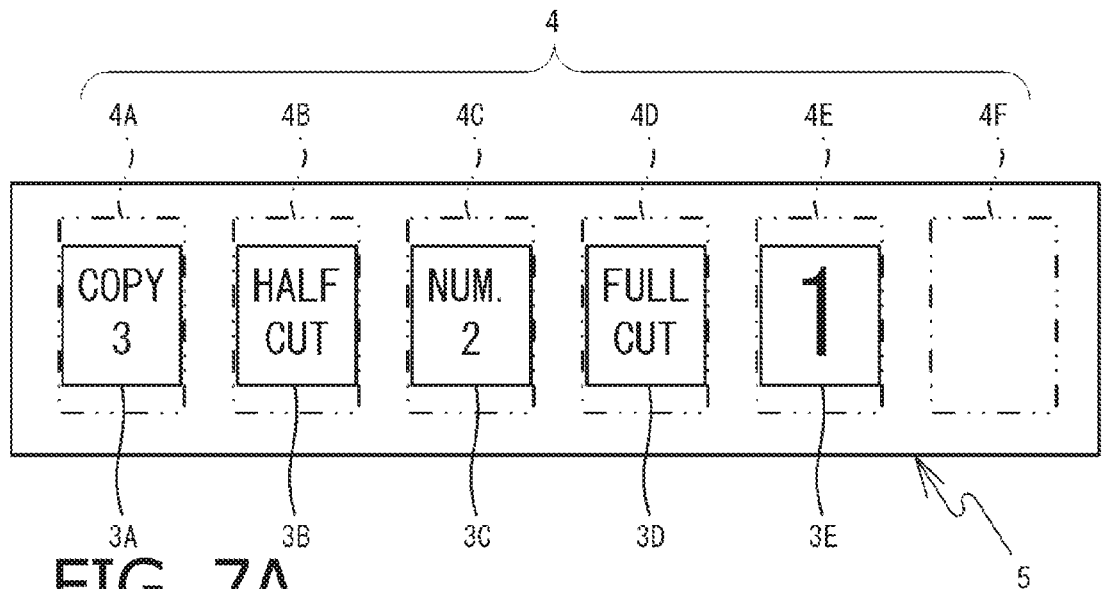
FIG. 7A is a displaying status on a display according to a first concrete example.

Referring to FIGS. 7A-8B, a first concrete example of a display form of the icons and character images will be described. FIG. 7A shows a first concrete example, in which the copy code indicating the number of executions of copying is three, the cut code indicating the half-cut operation, the numbering code indicating the number of executions of numbering is two, the cut code indicating the full-cut operation, and a character "1" are sequentially input.

In this case, an icon 3A corresponding to the copy code indicating the number of executions of copying is three is displayed in the individual display area 4A (K=1, S3: YES, S12). Further, an icon 3B corresponding to the half cut code is displayed in the individual display area 4B (K=2, S7: YES, S12). Next, an icon 4C corresponding to the numbering code indicating the number of executions of numbering is two is displayed in the individual display area 4C (K=3, S5: YES, S12). Further, an icon 3D corresponding to the cut code indicating the full-cut operation is displayed in the individual displaying area 4D (K=4, S7: YES, S12). Further, a character image 3E showing the character "1" is displayed in the individual display area 4E (K=5, S9: YES, S12).

Figure 8A:
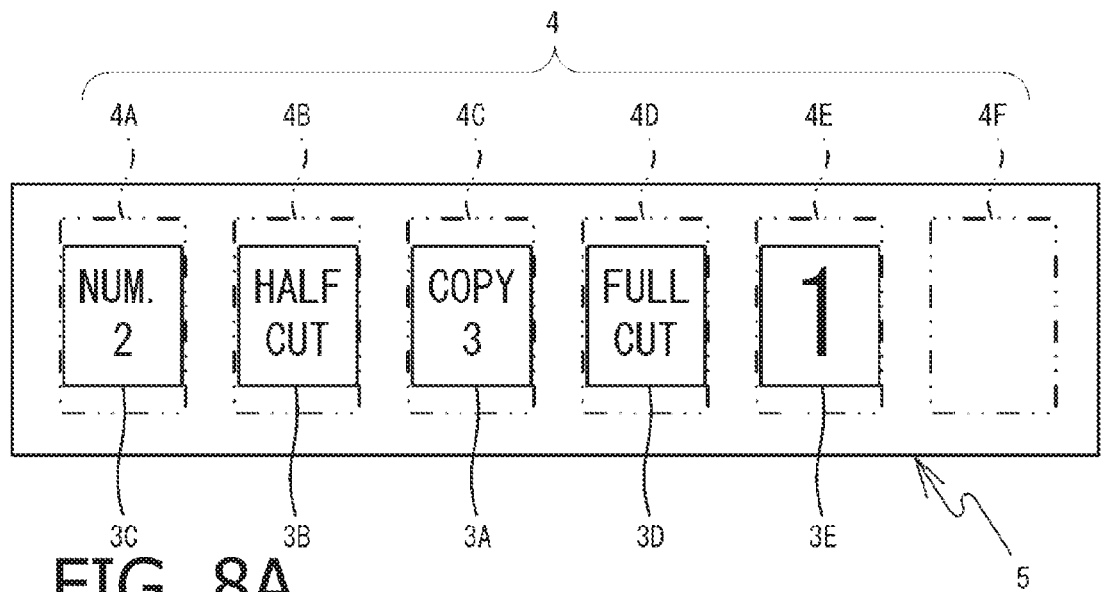
FIG. 8A is a displaying status on a display according to a second concrete example.

FIG. 8A shows a second concrete example, in which the numbering code indicating the number of executions of numbering is two, the cut code indicating the half-cut operation, the copy code indicating the number of executions of copying is three, the cut code indicating the full-cut operation, and the character "1" are input sequentially in this order. In this case, the icon 3C corresponding to the numbering code, which indicates the number of executions of numbering is two, is displayed in the individual display area 4C (K=1, S5: YES, S12). Further, the icon 3B corresponding to the half cut code is displayed in the individual display area 4B (K=2, S7: YES, S12). Next, the icon 3A corresponding to the copy code indicating the number of execution of copying is three is displayed in the individual display area 4C (K=3, S3: YES, S12). Further, the icon 3D corresponding to the cut code indicating the full-cut operation is displayed in the individual displaying area 4D (K=4, S7: YES, S12). Further, the character image 3E showing the character "1" is displayed in the individual display area 4E (K=5, S9: YES, S12).

As shown in FIG. 4, when the input information obtained in S2 is not a character (S9: NO), that is, when the input information obtained in S2 is the print start instruction, the CPU 71 executes a printing process (S14) and terminates the main process.

Hereinafter, referring to FIGS. 9-14, the printing process will be described. In the printing process, the target code and/or the target character (hereinafter, referred to as an "element") included in the print data are sequentially obtained in the order of arrangement of the icons/character images displayed in the plurality of individual display areas 4. That is, based on the sequentially obtained elements, the target codes and/or the target characters are set.

In the printing process, an identifying flag, a first cut flag and a second cut flag are referred to. The identifying flag, the first cut flag and the second cut flag are stored in a second storage area 74B. The identifying flag indicates an obtained order of the copy code and the numbering code. Specifically, when the obtained order of the copy code is earlier than the obtained order of the numbering code (including a case where the numbering code has not been obtained), the identifying flag is set to "1". When the obtained order of the numbering code is earlier than the obtained order of the copy code (including a case where the copy code has not been obtained), the identifying flag is set to "2". When none of the copy code and the numbering code has been obtained, the identifying flag is set to "0".

The first cut flag indicates whether the element obtained next to the copy code is the cut code, and when the element is the cut code, the first cut flag indicates whether the cut code indicates the full-cut operation or the half-cut operation. When the element obtained next to the copy code is not the cut code, the first cut flag is set to "0". When the element obtained next to the copy code is the cut code of the full-cut operation, the first cut flag is set to "1". When the element obtained next to the copy code is the cut code of the half-cut operation, the first cut code is set to "2".

The second cut flag indicates whether the element obtained next to the numbering code is the cut code, and when the element is the cut code, whether the cut code is of the full-cut operation or the half-cut operation. When the element obtained next to the numbering code is not the cut code, the second cut flag is set to "0". When the element obtained next to the numbering code is the cut code of the full-cut operation, the second cut flag is set to "1". When the element obtained next to the numbering code is the cut code of the half-cut operation, the second cut code is set to "2".

Figure 9:
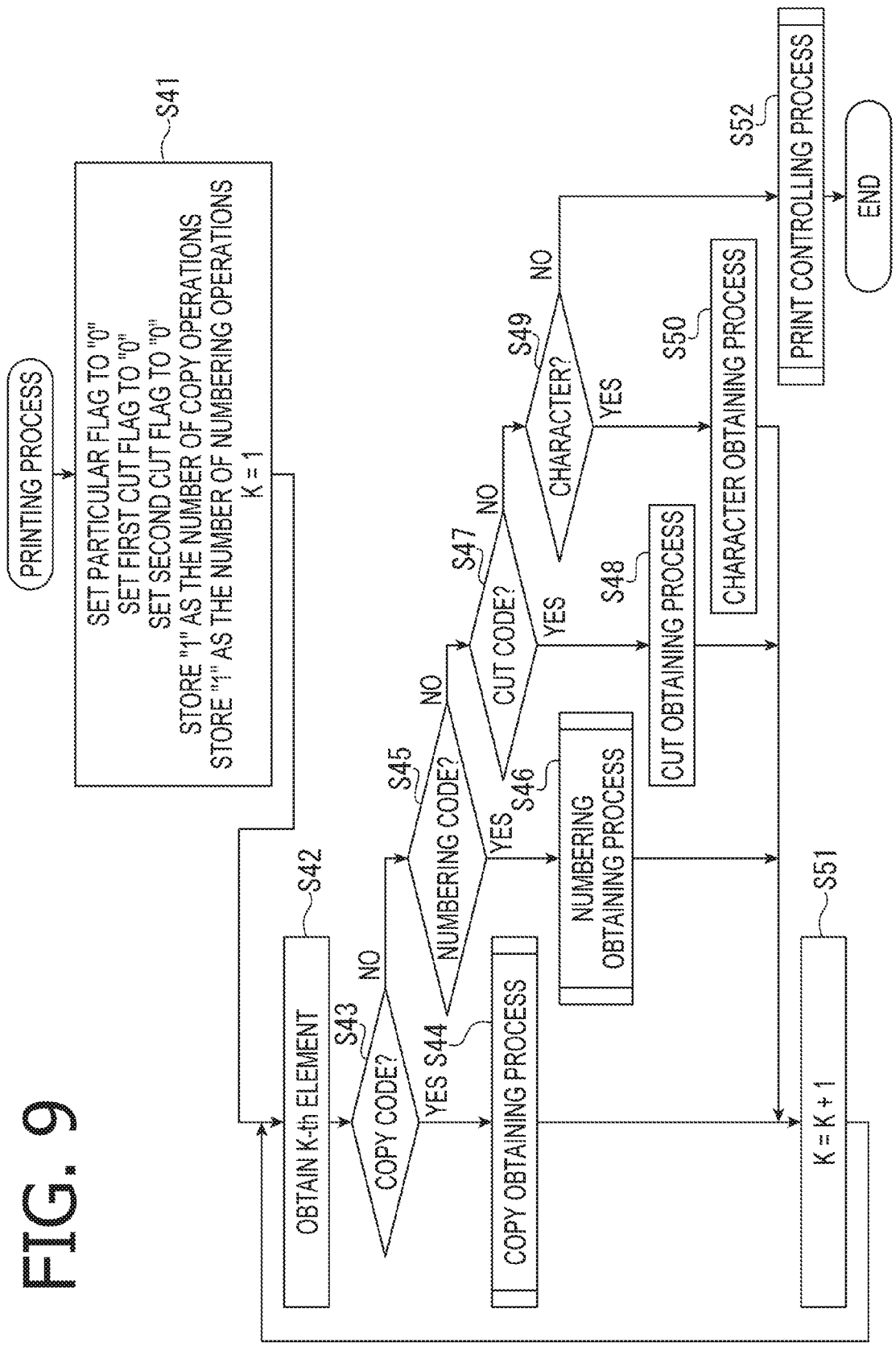
FIG. 9 is a flowchart illustrating a printing process executed by the CPU of the printing apparatus.

As shown in FIG. 9, the CPU 71 sets "0" to each of the identifying flag, the first cut flag and the second cut flag (S41). Further, the CPU 71 stores a value "1" as each of the number of executions of copying and the number of executions of numbering in the second storage area 75B (S41). Furthermore, the CPU 71 sets "1" to the value K of the display counter (S41).

In S42, the CPU 71 obtains an element corresponding to the K-th individual display area 4 from the first storage area 74A. Then, the CPU 71 determines whether the element obtained in S42 is the copy code (S43). When it is determined that the element obtained in S42 is the copy code (S43: YES), the CPU 71 executes a copy obtaining process (S44), and advances the process to S51.

Figure 10:
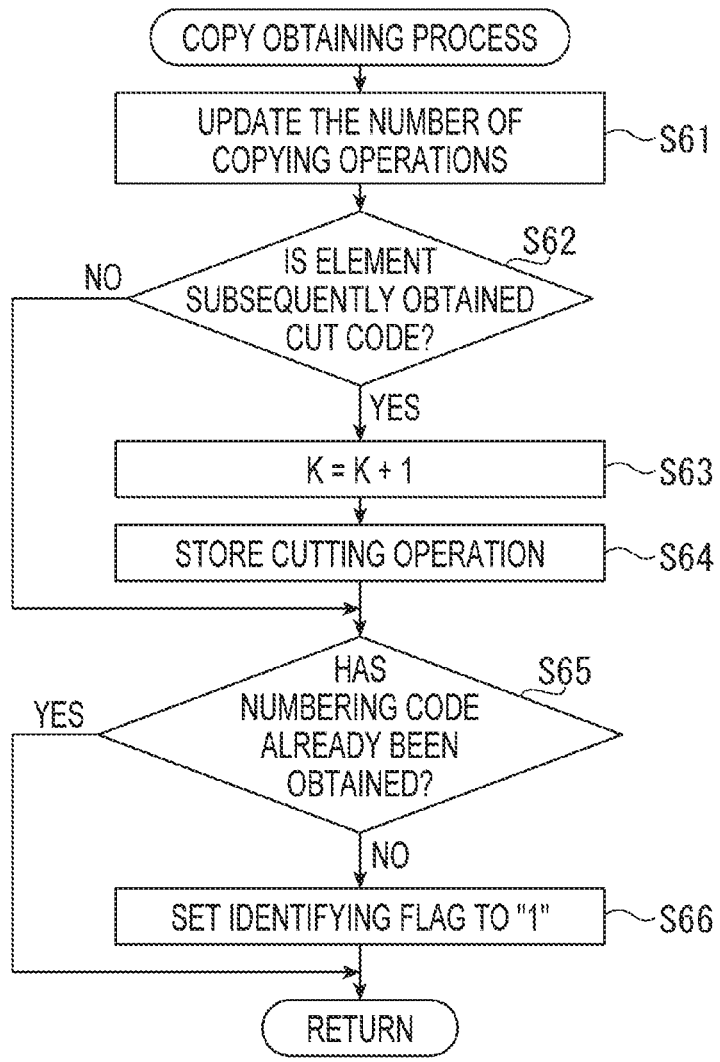
FIG. 10 is a flowchart showing a copy obtaining process executed by the CPU of the printing apparatus.

Next, the copy obtaining process will be described, referring to FIG. 10. The CPU 71 updates the number of executions of copying, which has been stored as "1" in the second storage area 74B in S41, with the number of executions of copying designated by the copy code obtained in S42 as the target code (S61). In S62, the CPU 71 obtains the element corresponding to the (K+1)-th individual display area 4, and determines whether the obtained element is the cut code. When it is determined that the element corresponding to the (K+1)-th individual display area 4 is not the cut code (S62: NO), the CPU 71 returns the process to S65.

When it is determined that the element corresponding to the (K+1)-th individual display area 4 is the cut code (S62: YES), the CPU 71 adds "1" to the value K of the display counter (S63). In S64, the CPU 71 stores the type of the cutting operation designated by the cut code (i.e., the half-cut operation or the full-cut operation) in the second storage area 74B. Specifically, when the cut code designates the full-cut operation, the first cut flag is set to "1". When the cut code designates the half-cut operation, the first cut flag is set to "2".

In S65, the CPU 71 determines whether the numbering code has been obtained in S42 based on the identifying flag. When the identifying flag is set to "2", the CPU 71 determines that the numbering code has been obtained in S42 (S65: YES), and the CPU 71 returns the process to the printing process (FIG. 9). When the identifying flag is set to "0", the CPU 71 determines that the numbering code has not been obtained in S42 (S65: NO), and the CPU 71 sets "1" to the identifying flag (S66). Thereafter, the CPU 71 returns the process to the printing process.

As shown in FIG. 9, when it is determined that the element obtained in S42 is not the copy code (S43: NO), the CPU 71 determines whether the element obtained in S42 is the numbering code (S45). When it is determined that the element obtained in S24 is the numbering code (S45: YES), the CPU 71 executes a numbering obtaining process (S46), and advances the process to S51.

Figure 11:
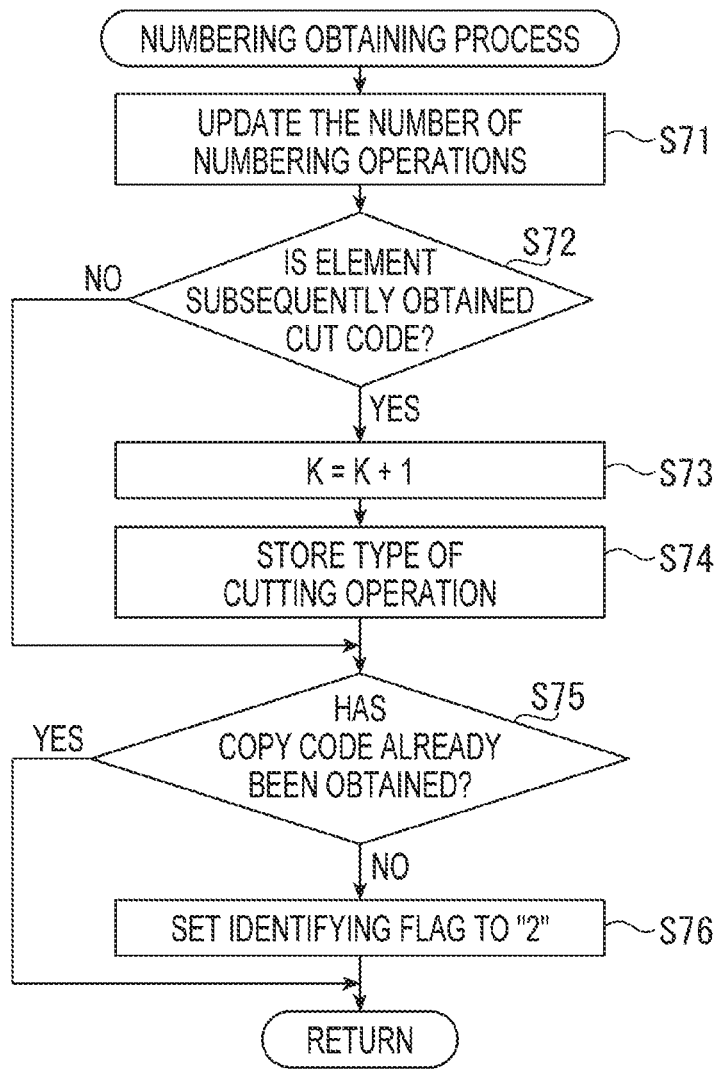
FIG. 11 is a flowchart showing a numbering obtaining process executed by the CPU of the printing apparatus.

Referring to FIG. 11, a numbering obtaining process will be described. In S41 (see FIG. 9), the CPU 71 updates the number of executions of the numbering operations, which is stored as "1" in the second storage area 74B, with the number of executions of numbering operations designated by the numbering coded obtained as the target code in S42 (S71). The CPU 71 obtains the element corresponding to the (K+1)-th individual display area 4, and determines whether the thus obtained element is the cut code (S72). The CPU 71 obtains the element corresponding to the (K+1)-th individual display area 4, and determines whether the obtained element is the cut code (S72). When it is determined that the obtained element corresponding to the (K+1)-th individual display area 4 is not the cut code (S72: NO), the CPU 71 advances the process to S75.

When it is determined that the element corresponding to the (K+1)-th individual display area 4 is the cut code (S72: YES), the CPU 71 adds "1" to the value K of the display counter (S73). Then, the CPU 71 stores the type of the cutting operation (i.e., the half-cut operation or the full-cut operation) designated by the cut code in the second storage area 74B (S74). Specifically, when the cut code designates the full-cut operation, the second cut flag is set to "1", while, when the cut code designates the half-cut operation, the second cut flag is set to "2".

The CPU 71 determines whether the copy code has been obtained in S42 (see FIG. 9) based on the status of the identifying flag (S75). Specifically, when the identifying flag is set to "1", the CPU 71 determines that the copy code has been obtained in S42 (S75: YES), and returns the process to the printing process (see FIG. 9). When the identifying flag is set to "0", the CPU 71 determines that the copy code has not been obtained in S42 (S75: NO), and the CPU 71 sets "2" to the identifying flag (S66). Thereafter, the CPU 71 returns the process to the printing process.

As shown in FIG. 9, when the element obtained in S42 is not the numbering code (S45: NO), the CPU 71 determines whether the element obtained in S42 is the cut code (S47). When it is determined that the element obtained in S42 is the cut code (S47: YES), the CPU 71 execute the cut obtaining process (S48), and advances the process to S51. In the cut obtaining process, the type of the cutting operation (i.e., the half-cut operation or the full-cut operation) designated by the cut code, which was obtained as the target code, and the cut position corresponding to the position of the individual display area 4 displaying the icon corresponding to the cut code are stored in the second storage area 74B.

When the element obtained in S42 is not the cut code (S47: NO), the CPU 71 determines whether the element obtained in S42 is a character (S49). When it is determined that the element obtained in S42 is the character (S49: YES), the CPU 71 executes a character obtaining process (S50), and advances the process to S51. In the character obtaining process, the character obtained as the target character is stored in the second storage area 74B.

After execution of S44, S46, S48 or S50, the CPU 71 adds "1" to the value K of the display counter (S51), and returns the process to S42. With this process, respective elements of the print data (i.e., the target codes and/or the target characters) are sequentially obtained in accordance with the order in which the icons and/or character images are arranged in the individual display areas 4.

When it is determined that the element obtained in S42 is not the control code or the character, all the target codes and the target characters of the print data have been obtained based on the character images and icons displayed in the individual display areas 4. Therefore, when it is determined that the element obtained in S42 is not the character (S49: NO), the CPU 71 executes the print controlling process (S52), and returns the process to the main process (see FIG. 4).

Hereinafter, referring to FIG. 12, the print controlling process will be described. In the print controlling process, printing executed by the thermal head 10 is controlled based on the target codes and target characters. Specifically, when multiple control codes, which instruct different processes, and characters are obtained in accordance with a particular order, the multiple processes (e.g., the copying process, the numbering process, the cutting process) designated by the multiple target codes are executed in accordance with the obtained order of the multiple control codes, and printing based on the target characters is executed.

The CPU 71 obtains the target character from the second storage area 74B and stores the same in a third storage area 74C (S81). Then, the CPU 71 identifies the obtained order of the copy code and the numbering code in S42 depending on the status of the identifying flag (S83). Specifically, when the identifying flag is set to "0", it is identified that none of the copy code and the numbering code has been obtained. When the identifying flag is set to "1", it is identified that the obtained order of the copy code is earlier than that of the numbering code (including a case where the numbering codes has not been obtained). When the identifying flag is set to "2", it is identified that the obtained order of the numbering code is earlier than that of the copy code (including a case where the copy code has not been obtained).

In S84, the CPU 71 determines whether the obtained order of the copy code is earlier than that of the numbering code. When it is determined that the obtained order of the copy code is earlier than that of the numbering code (S84: YES), the CPU 71 executes a first printing process (S85), and returns the process to the printing process (see FIG. 9). For example, in a case of the first concrete example shown in FIG. 7A, the icon 3A corresponding to the copy code is displayed on the individual display area 4 on the left side with respect to the individual display area 4 displaying the icon 3C which corresponds to the numbering code. Therefore, since the obtained order of the copy code is earlier than the obtained order of the numbering code, the first print controlling process is executed based on the print data according to the first concrete example.

Figure 7B:
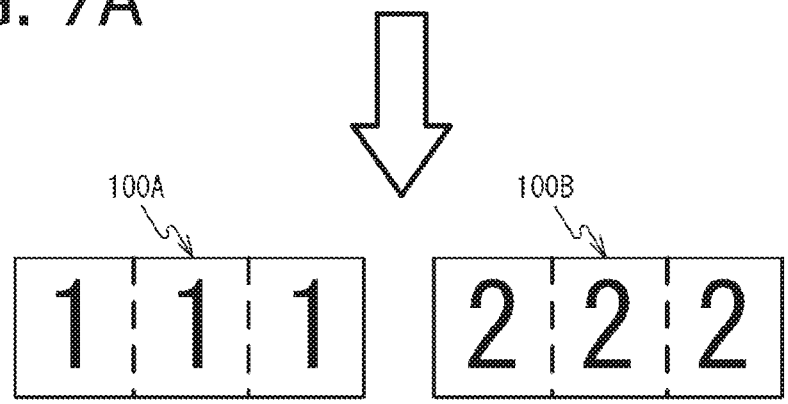
FIG. 7B shows printed products according to the first concrete example.
Figure 13:
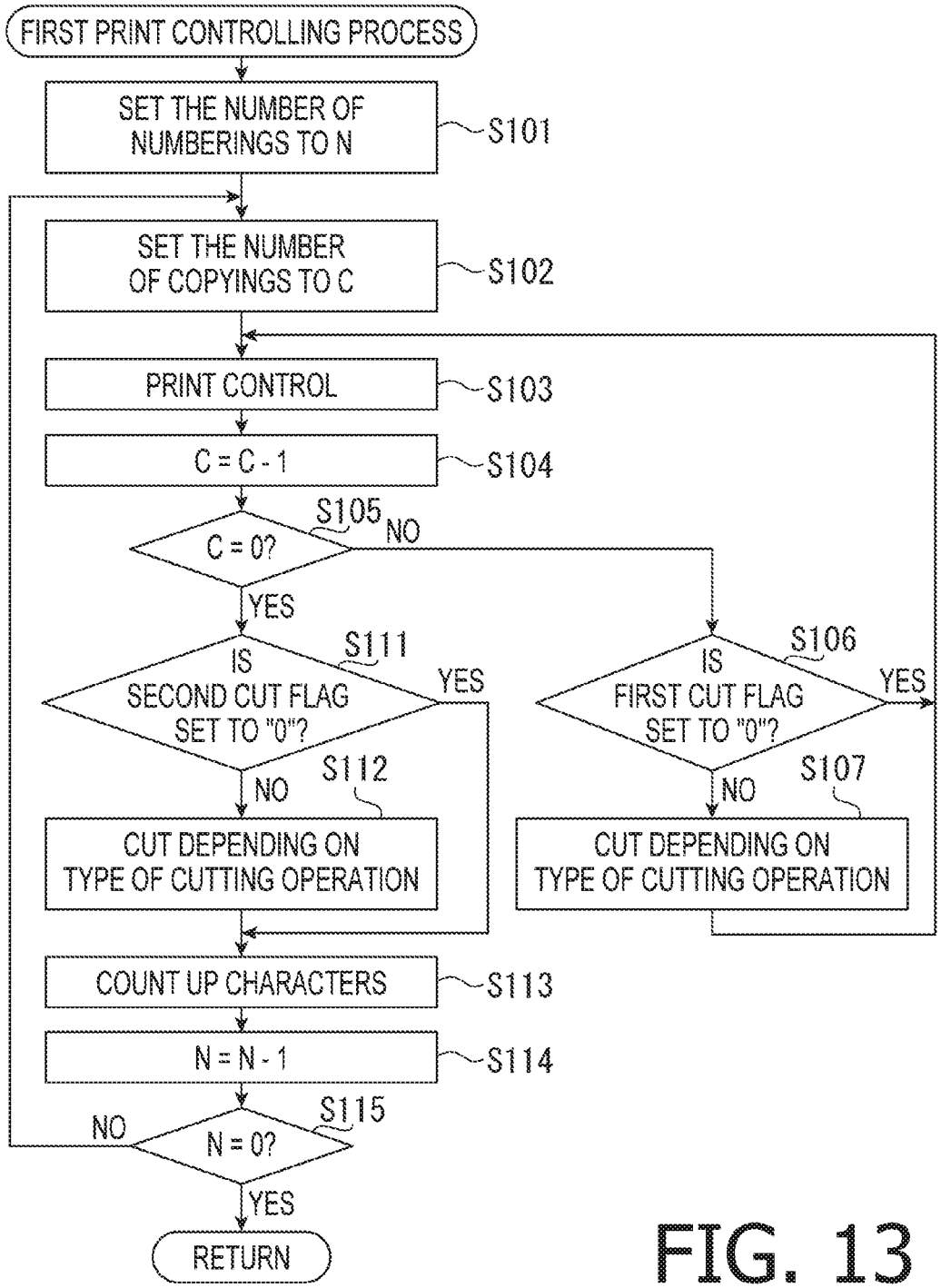
FIG. 13 is a flowchart showing a first print controlling process executed by the CPU of the printing apparatus.

Referring to FIG. 13, the first print controlling process will be described using the first concrete example shown in FIGS. 7A and 7B as an example. In the first print controlling process, a first copy printing is executed based on the copying process, and a first numbering process is executed based on the numbering process. In this case, the unit printing is a printing using a single character as a unit. In the first copy printing, the unit printing is repeatedly executed until the number of executions of the unit printing reaches a particular number of copy operations. In the first numbering printing, the number of the character is counted up at every execution of the first copy printing, and the first copy printing is repeatedly executed until the number of executions of the first copy printing reaches a particular number of executions of numbering.

When the obtained order of the cut code is next to the obtained order of the copy code (i.e., when the icon corresponding to the cut code is displayed in the individual display area 4 on the right side with respect to the individual display area 4 displaying the icon corresponding to the copy code), the half-cut operation or the full-cut operation is executed at every execution of the unit printing, based on the cut process.

When the obtained order of the cut code is next to the obtained order of the numbering code (i.e., when the icon corresponding to the cut code is displayed in the individual display area 4 on the right side with respect to the individual display area 4 displaying the icon corresponding to the numbering code), the half-cut operation or the full-cut operation is executed at every execution of the first copy printing, based on the cut process.

The CPU 71 obtains the number of executions ("2") of numbering stored in the second storage area 74B, and set the value "2" to the value N of the numbering counter (S101). The numbering counter is stored in the third storage area 74C. Further, the CPU 71 obtains the number of executions of copying ("3") stored in the second storage area 74B, and sets the value "3" to the value C of the copy counter (S102). The copy counter is also stored in the third storage area 74C.

The CPU 71 prints out the character ("1") stored in the third storage area 74C on the tape 50 (S103). Then, the CPU 71 subtracts "1" from the value C of the copy counter (S104). Next, the CPU 71 determines whether the value C of the copy counter is "0" (S105). When it is determined that the value C of the copy counter is not "0" (S105: NO), the CPU 71 determines whether the first cut flag is set to "0" (S106). When it is determined that the first cut flag is set to "0" (S106: YES), the CPU 71 returns the process to S103 without cutting the tape 50.

When it is determined that the first cut flag is not set to "0" (S106: NO), the CPU 71 cuts the tape 50 in accordance with the type of the cutting operation (S107). That is, the full-cut operation is executed in S107 when the first cut flag is set to "1", while the half-cut operation is executed in S107 when the first cut flag is set to "2". In the first concrete example shown in FIG. 7A, the half-cut operation is executed. Thereafter, the CPU 71 returns the process to S103. With the above control, printing of the character "1" (i.e., unit printing) and the half-cut operation are repeatedly executed in accordance with the number of executions of copying.

When it is determined that the value C of the copy counter is set to "0" (S105: YES), the CPU 71 determines whether the second cut flag is set to "0" (S111). In the first concrete example shown in FIG. 7A, the number of executions of copying is three, when, for example, the character "1" is printed three times, the value C of the copy counter becomes "0". When the second cut flag is set to "0" (S111: YES), the CPU 71 advances the process to S113, without cutting the tape 50. When it is determined that the second cut flag is not set to "0" (S111: NO), the CPU 71 cuts the tape 50 in accordance with the type of the cutting operation (S112). That is, the full-cut operation is executed when the second cut flag is set to "1", while the half-cut operation is executed when the second cut flag is set to "2" in S112. In the example shown in FIG. 7A, the full-cut operation is executed.

The CPU 71 updates the characters stored in the third storage area 74C by counting up the same in accordance with a particular order (S113). In the concrete example shown in FIG. 7A, counting up of the character from "1" to "2" is performed in the third storage area 74C. Then, the CPU 71 subtracts "1" from the value N of the numbering counter (S114). Thereafter, the CPU 71 determines whether the value N of the numbering counter is set to "0" (S115). When it is determined that the value N of the numbering counter is not set to "0" (S115: NO), the CPU 71 returns the process to S102. Then, the number of executions of copying stored in the second storage area 74B is obtained again, and the obtained value is set to the value C of the copy counter (S102). According to the above process, printing of the counted-up character "2" and the half-cut operation area repeatedly executed in accordance with the number of executions of copying (S103-S107).

When the value N of the numbering counter is set to "0" (S115: YES), the CPU 71 returns the process to the print controlling process (see FIG. 12). According to the first concrete example shown in FIG. 7A, since the number of executions of numbering is two, the value N of the numbering counter is set to "0" after the character "2" is printed three times (S115: YES), and the first print controlling process is terminated.

According to the first print controlling process described above, printed products 100 shown in FIG. 7B can be obtained. The printed products 100 includes a first printed product 100A and a second printed product 100B. Specifically, the first printed product 100A is created such that, after the character "1" is printed three times with the half-cut operation therebetween, the printed portion is cut out by the full-cut operation. Thereafter, the counted-up character "2" is printed three times with the half-cut operation therebetween, thereby the second printed product 100B is created. It is noted that, in FIG. 7B, a cut status by the half-cut operation is indicated by broken lines (so is in FIG. 8B).

Figure 12:
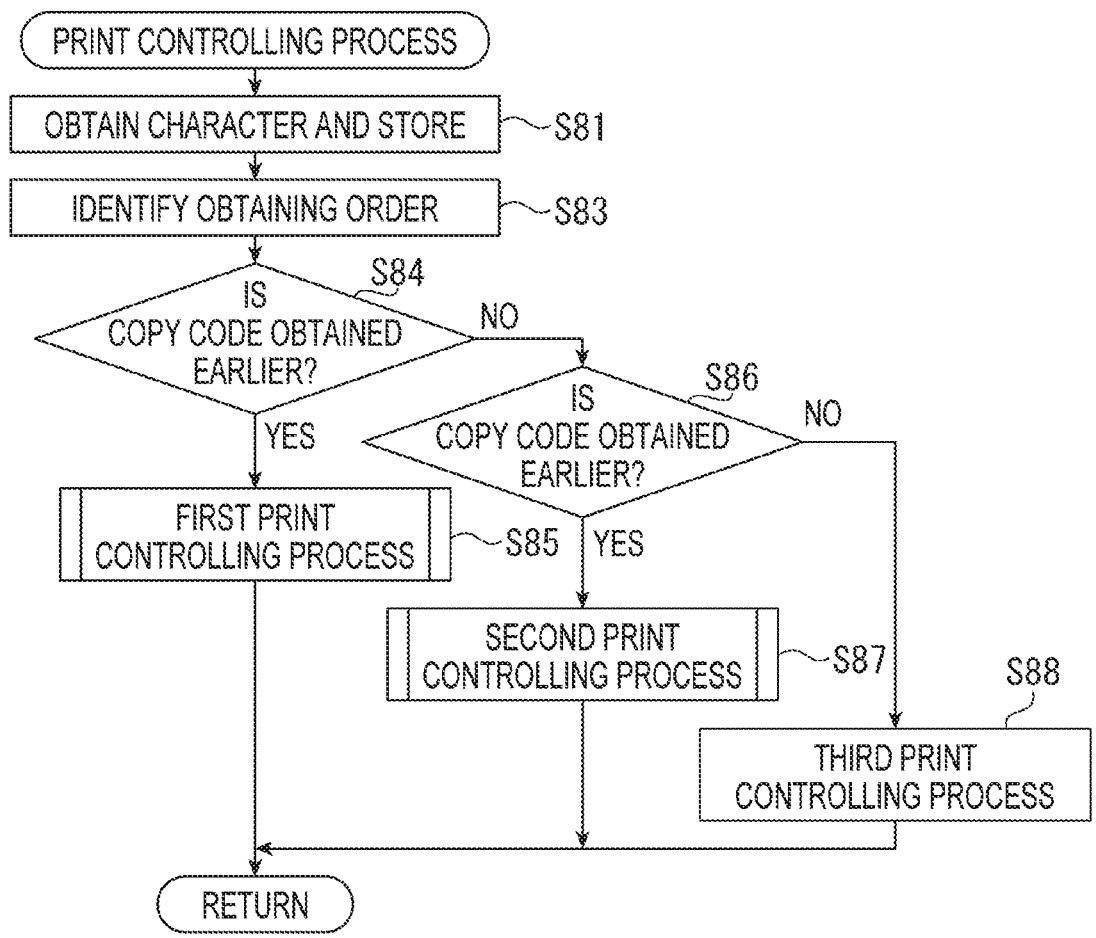
FIG. 12 is a flowchart showing a print controlling process executed by the CPU of the printing apparatus.

As shown in FIG. 12, when the obtained order of the copy code is not earlier than that of the numbering code (S84: NO), the CPU 71 determines whether the numbering code is obtained earlier than the copy code (S86). When it is determined that the numbering code is obtained earlier than the copy code (S86: YES), the CPU 71 executes the second print controlling process (S87), and returns the process to the printing process shown in FIG. 9. For example, according to the second concrete example shown in FIG. 8A, the icon 3C corresponding to the numbering code is displayed on the individual display area 4 which is on the left side with respect to the individual display area 4 displaying the icon 3A corresponding to the copy code. Thus, the obtained order of the numbering code is earlier than that of the copy code. Therefore, according to the print data of the second concrete example, the second print controlling process is executed.

Figure 14:
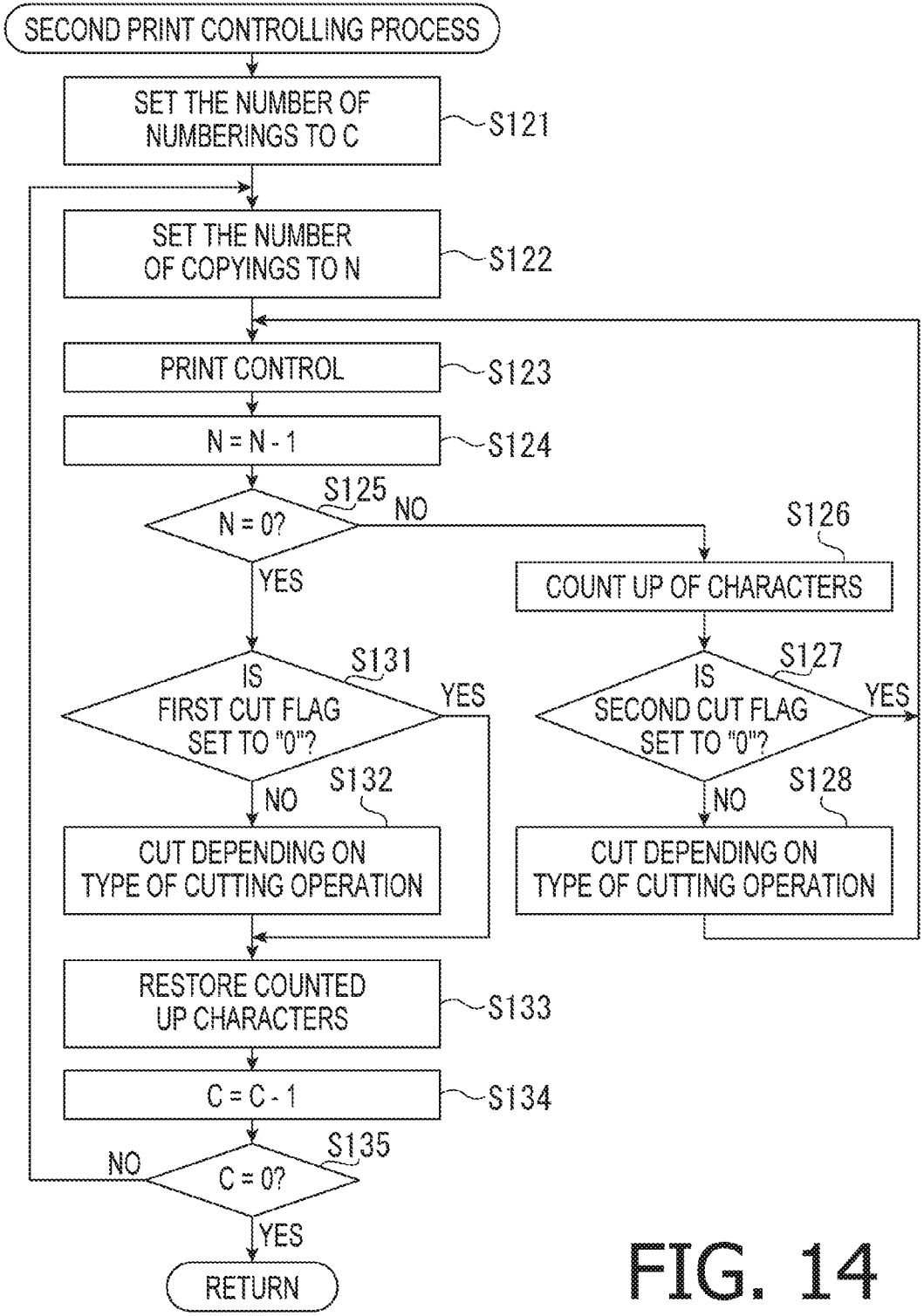
FIG. 14 is a flowchart showing a second print controlling process executed by the CPU of the printing apparatus.

Referring to FIG. 14, and in accordance with the second concrete example shown in FIGS. 8A and 8B, the second print controlling process will be described. In the second print controlling process, a second numbering printing is executed based on the numbering process, and a second copying process is executed based on the copying process. In this case, the unit printing is the second numbering process. In the second numbering process, at every printing of one character, the character is counted up. Until the number of executions of printing of the counted-up character reaches a particular number of executions of numbering, printing of the counted-up character is repeatedly executed. In the second copying process, until the number of executions of the second numbering process reaches a particular number of copying operations, the second numbering process is repeatedly executed.

When the obtained order of the cut code is next to that of the copy code (i.e., when an icon corresponding to the cut code is displayed in the individual display area 4 on the right side with respect to the individual display area displaying an icon corresponding to the copy code), the half-cut operation or full-cut operation is executed, based on the cut process, at every execution of the second numbering process.

When the obtained order of the cut code is next to that of the numbering code (i.e., when an icon corresponding to the cut code is displayed in the individual display area 4 on the right side with respect to the individual display area displaying an icon corresponding to the numbering code), the half-cut operation or full-cut operation is executed, based on the cut process, at every printing of the counted-up character.

The CPU 71 obtains the number of executions of copying ("3") stored in the second storage area 74B, and sets the obtained number to the value C of the copy counter (S121). The CPU 71 then obtains the number of executions of numbering ("2") stored in the second storage area 74B, and sets the obtained number to the value N of the numbering counter (S122).

The CPU 71 prints out the character "1" stored in the third storage area 74C on the tape 50 (S123). Then, the CPU 71 subtracts "1" from the value N of the numbering counter (S124). The CPU 71 then determines whether the value N of the numbering counter is "0" (S125). When it is determined that the value N of the numbering counter is not "0" (S125: NO), the CPU 71 updates the character stored in the third storage area 74C by counting up the same in accordance with a particular arranging order (S126). In the second concrete example shown in FIG. 8A, counting up of the character from "1" to "2" is performed in the third storage area 74C.

The CPU 71 determines whether the second cut flag is set to "0" (S127). When it is determined that the second cut flag is set to "0" (S127: YES), the CPU 71 does not cut the tape 50 and returns the process to S123. When it is determined that the second cut flag is not set to "0" (S127: NO), the CPU 71 cuts the tape 50 in accordance with the type of cutting process (S128). In S128, the full-cut operation is performed when the second cut flag is set to "1", while the half-cut operation is performed when the second cut flag is set to "2". In the second concrete example shown in FIG. 8A, the half-cut operation is performed. The CPU 71 then returns the process to S123. As above, counting up of the character, printing of the counted-us character, and the half-cut operation are repeatedly executed in accordance with the number of executions of numbering process.

When it is determined that the value N of the numbering counter is set to "0" (S125: YES), the CPU 71 determines whether the first cut flag is set to "0" (S131). In the second concrete example shown in FIG. 8A, since the number of executions of numbering operations is set to "2", when the characters "1" and "2" are printed, respectively, the value N of the numbering counter becomes "0". When it is determined that the first cut flag is set to "0" (S131: YES), the CPU 71 does not cut the tape and advances the process to S133. When it is determined that the first cut flag is not set to "0" (S131: NO), the CPU 71 cuts out the tape 50 in accordance with the type of the cutting operation (S132). In S132, the full-cut operation is performed when the first cut flag is set to "1", while the half-cut operation is performed when the first cut flag is set to "2". In the second concrete example shown in FIG. 8A, the full-cut operation is performed.

The CPU 71 returns the character counted up in S126 to the character before counted back (S136). In S133, the character stored in the second storage area 74B is obtained again, and the CPU 71 overwrites the counted-up character stored in the third storage area 74C with the character obtained in S133. In the second concrete embodiment shown in FIG. 8A, the character "2" stored in the third storage area 74C is overwritten with the character "1" stored in the second storage area 74B. The CPU 71 subtracts "1" from the value C of the copy counter (S134). Then, the CPU 71 determines whether the value C of the copy counter is "0" (S135). When it is determined that the value C of the copy counter is not "0" (S135: NO), the CPU 71 returns the process to S122. With this control, the number of executions of numbering operation stored in the second storage area 74B is obtained again, which is set to the value N of the numbering counter (S122). With this control, the second numbering process of the character "1" and the half-cut operation are repeatedly executed in accordance with the number of executions of numbering process (S123-S128).

When the value C of the copy counter is set to "0" (S135: YES), the CPU 71 returns the process to the print controlling process (see FIG. 12). In the second concrete example shown in FIG. 8A, the number of executions of copying is set to "3". Therefore, after the characters "1" and "2" are printed three times, the second print controlling process is terminated as the value C of the copy counter becomes "0" (S135: YES).

Figure 8B:
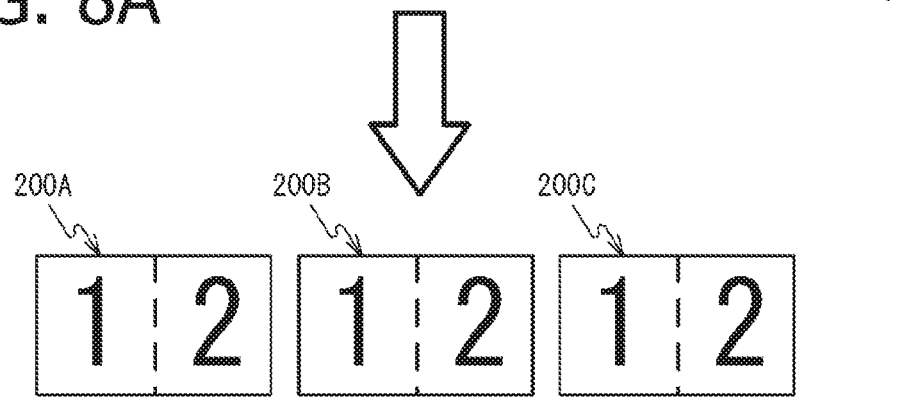
FIG. 8B shows printed products according to the second concrete example.

As the second print controlling process is executed, printed products 200 shown in FIG. 8B. The printed products 200 includes a first printed product 200A, a second printed product 200B and a third printed product 200C.

Specifically, the first printed product 200A is created such that the characters "1" and "2" are printed with the half-cut operation performed therebetween, and then the full-cut operation is performed so that the tape 50 is cut out. The second printed product 200B and the third printed product 200C are created sequentially in the same manner.

As shown in FIG. 12, when the obtained order of the numbering code is not earlier than that of the copy code (S86: NO), that is, when none of the copy code and the numbering code has been obtained, the CPU 71 executes a third print controlling process (S88), and returns the process to the printing process (see FIG. 9). In the third print controlling process, the target character stored in the second storage area 74B is printed on the tape 50, and the half-cut operation or the full-cut operation is executed based on the cut position and the type of the cutting operation (i.e., the half-cut operation or the full-cut operation) stored in the second storage area 74B in S48. For example, when the obtained order of the cut code is next to the obtained order of the target character, an upstream side part, in the tape conveying direction, with respect to the position where the target character is printed is cut.

As described above, since there are multiple individual display areas 4 each selectively displaying the character image or the icon, it is not necessary that the printing apparatus 1 is provided with a display area for displaying the character image and a display area for displaying the icon separately in the display 5. Therefore, upsizing of the display 5 can be suppressed. Further, the multiple individual display areas 4 are arranged in a particular order. That is, the character images and the icons are displayed on the same line in the particular order. Therefore, the user can recognize the process related to the print control of the characters with monitoring the characters to be printed on the tape 50 by viewing the character images and the icons displayed on the multiple individual display areas 4, respectively. Accordingly, the printing apparatus 1 can make the user recognize the process related to the print controlling of the characters, with suppressing upsizing of the display 5.

When multiple target codes respectively indicating different processes are obtained in S42, the printing apparatus 1 executes the multiple processes (S85 or S87) in accordance with the obtained order of the target codes. Therefore, when the multiple target codes respectively indicating different processes are obtained, the printing apparatus 1 is capable of providing different printed products corresponding to the obtained order of the multiple target codes with the user. The user can create different printed products easily, simply by changing the order of the multiple target codes respectively designating different processes in the individual display areas 4. According to the embodiment, the first concrete example (see FIG. 7A) and the second concrete example (see FIG. 8A) are different such that the control codes indicating the different processes are displayed in the individual display areas 4 are different although input characters and the types of the control codes are the same. Therefore, the printing apparatus 1 is capable of providing different printed products 100 and 200 with the user.

Depending on the obtained order in which the copy codes and the numbering codes area obtained as the target codes, the order of execution of the copying process and the numbering process may be different in the printing apparatus 1. Therefore, the printing apparatus 1 is capable of providing different printed products with the user in accordance with the obtained order of the copy codes and the numbering codes. In the first concrete example (see FIG. 7A), the obtained order of the copy code is earlier than that of the numbering code, while, in the second concrete example (see FIG. 8A), the obtained order of the numbering code is earlier than that of the copy code. According to the above, the printing apparatus 1 is capable of providing different printed products 100 and 200 (see FIGS. 7B and 8B) with the user.

The printing apparatus 1 is capable of setting the copy code, the numbering code, and the cut code. Therefore, by combining the above codes in various ways, the printing apparatus 1 can provide the user with various types of printed products.

The above embodiment can be modified in various ways without departing from the aspects of the present disclosures. For example, the control code need not be limited to the copy code, the numbering code and the cut code. According to aspects of the disclosures, the control code may only be the copy code and the numbering code. The control code may include, for example, a double-size code and a bold code. The double-size code indicates a double-size process to double the width of a character. The bold code indicates a bold process to make the font of the character to a bold font. In this case, when the obtained order of the double-size code is earlier than that of the bold code in S42, the printing apparatus 1 applies the double-size process with respect to the character, and then applies the bold process. When the obtained order of the bold code is earlier than that of the double-size code in S42, the printing apparatus 1 applies the bold process to the character, and then applies the double-size process. In this case, the printing apparatus 1 is capable of supplying the different printed products to the user. Specifically, the character to which the double-size process is applied after the bold process is applied has a thicker font than the character to which the bold process is applied after the double-size process is applied.

The control code may include the double-size code and a rotation code. The rotation code indicates a rotation process to rotate an orientation of the character to be printed by 90 degrees. In the rotation process, for example, the character for horizontal writing (or a vertical writing) to one for the vertical writing (or the horizontal writing). In this case, when the obtained order of the rotation code is earlier than that of the double-size code in S42, the printing apparatus 1 applies the double-size process to the character after the printing apparatus 1 applies the rotation process to the character. When the obtained order of the double-size code is earlier than that of the rotation code in S42, the printing apparatus 1 applies the rotation process to the character after the printing apparatus 1 applies the double-size process to the character. Thus, the printing apparatus 1 is capable of providing the user with different printed products. Specifically, when the double-size process is executed after the rotation process, the width of the character after rotated is double-sized. When the rotation process is executed after the double-size process is executed, the width of the character before rotated is double-sized. That is, when the rotation process is executed after the double-size process is executed, a vertical length of the character, which has been rotated, is double-sized.

The multiple individual display areas 4 are aligned in a row from left to right. Aspects of the disclosures need not limited to such a configuration. The multiple individual display areas 4 may be aligned from right to left, or up to down. A plurality of rows may be aligned. The number of the multiple individual display areas 4 need not be limited to the configuration of the above embodiment. In such a case, the printing apparatus 1 displays the icons and/or character images in the order where the multiple individual display areas 4 are aligned in S12. The printing apparatus 1 sequentially obtains the elements in the order where the icons and/or character images are aligned in the multiple individual display areas 4 in S42.

In the above-described embodiment, the character images and/or icons are displayed from the leftmost individual display areas 4 in accordance with the input order. In contrast, the printing apparatus 1 need not display the character images and/or icons in the order where the individual display areas 4 area aligned in accordance with the input order. For example, the printing apparatus 1 may be configured to select the individual display area 4 subject to display the character image or the icon. The printing apparatus 1 may be configured to display, after the user selects the target individual display area 4, a character image indicating the icon or the character corresponding to the input control code in the selected individual display area 4. Further, the printing apparatus 1 may be configured to exchange the order of the individual display areas 4 in which the icons and/or character images are displayed. It is noted that the icons 3A-3D and the character 3E are only concrete examples, and may have different shapes.

In the above-described embodiment, data designating the number of executions of copying is included in the copy code, and data designating the number of executions of the numbering operation is included in the numbering code. However, the number of executions of copying and the number of executions of the numbering operation may be designated by data which is different from the copy code or the numbering code. Further, the cut code includes data designating the type of the cutting operation. However, the type of the cutting operation may be designated by data different from the cut code.

In the above-described embodiment, the cut code indicates the cut process. However, the cut code may indicate the cut process or a cut prohibiting process to prohibit cutting of the tape 50. That is, the cut code may include, only when indicating the cut process, the data designating the type of the cutting operations (i.e., the half-cut operation or the full-cut operation).

When the user does not want to cut the tape 50 at a particular position, the user inputs the cut code indicating the cut prohibiting process in the individual display area 4 corresponding to the particular position. In this case, since the icon corresponding to the cut code indicating the cut prohibiting process is displayed in the individual display area 4 corresponding to the particular position, the user can recognize that the tape 50 will not be cut at the particular position simply by viewing the display 5.

When the second cut flag is set to "0" (S111: YES), when the first cut flag is set to "0" (S131: YES), since printing based on the print data has been completed, the full-cut operation may be executed after it is determined to be YES in S115, or it is determined to be YES in S135. In S113 or S126, the character is counted up in accordance with a particular arrangement order. However, this may be modified such that the character may be counted down in accordance with a particular arrangement order.

The printing apparatus 1 may be an inkjet printer which executes printing on a printing medium such as a printing sheet using an ink cartridge, or a laser beam printer which executes printing on the printing medium using toner. In this case, the control code may include the copy code, the numbering code and an aggregation code. The aggregation code indicates an aggregation process to aggregate multiple pages including the characters subject to printing on one sheet (e.g., 4-in-1 printing). In this case, the printing apparatus 1 is configured to provide the user with different printed products in accordance with obtained order of respective codes.

It is noted that, instead of the CPU 71, a microcomputer, an ASIC, an FPGA and the like may be used as a processor. The main process and the like may be executed in distributed processes. The ROM 72 and the flash memory 75 may not include a transitory recording medium (e.g., a transmitted signal). The program may be downloaded from a server connected to a network (i.e., transmitted as a transmitted signal), and then stored in the flash memory 75. In this case, the program may be stored in a non-transitory recording medium such as an HDD provided to the server.

It is noted that the term "half-cut operation" in the present disclosures is intended to mean an operation to partially cut the tape. According to the illustrative embodiment, the half-cut operation is an operation to partially cut the tape in the thickness direction thereof. It is noted, however, the aspects of the present disclosures need not be limited to such an operation. That is, an operation to partially cut a printing medium (e.g., the tape) may include an operation of partially cutting the printing medium in the width direction, or an operation of forming perforations to the printing medium.

It is noted that the "numbering operation" in the illustrative embodiment is an operation of changing the number. According to the aspects of the disclosure, the numbering operation could also be interpreted to include an operation of changing a character or a character string in accordance with a particular order.

What is claimed is:

1. A printing apparatus, comprising:
   a printer configured to print a character on a printing medium;
   a display including multiple individual display areas arranged in a particular order; and
   a controller
   configured to:
      display one of a character image and an icon on each of the multiple individual display areas, the character image being an image indicating the character, the icon corresponding to a control code indicating a process related to a print control of a character;
      obtain characters and control codes sequentially in accordance with an order in which the icons and the character images are arranged in the multiple individual display areas;
      when control codes indicating different processes are obtained, execute processes indicated by the control codes in accordance with an order corresponding to the order in which the control codes are obtained; and
      control printing performed by the printer based on the control codes and the characters indicated by the character images.

2. The printing apparatus according to claim 1,
   wherein the control codes includes:
   a first code indicating a copying process to cause the printing apparatus to repeatedly execute a printing operation using a particular number of characters as one unit in accordance with the number of executions of copying; and
   a second code indicating a numbering process to cause the printing apparatus to update a character in accordance with a particular arrangement order, and to repeatedly execute printing of the updated character in accordance with a particular number of executions of numbering operations, and wherein, when the first code and the second code are obtained, the controller controls printing based on the characters obtained by executing the copying process and the numbering process in accordance with an obtained order of the first code and the second code.

3. The printing apparatus according to claim 2,
   further comprising a cutter,
   wherein the control codes includes a third code indicating a cut process to cause the printer to cut at least a part of the printing medium, and
   wherein, when the third code is obtained, the controller controls the printing apparatus to cut at least a part of the printing medium.

4. The printing apparatus according to claim 2,
   further comprising a cutter,
   wherein the control codes includes a third code indicating one of a cut process and a cut prohibit process, the cut process causing the printing apparatus to cut at least part of the recording medium, the cut prohibit process cause the printing apparatus not to cut the recording medium, and
   wherein, when the third code is obtained indicating the cut process, the controller causes the printing apparatus to cut at least a part of the recording medium.

5. A non-transitory recording medium for a printing apparatus having a printer configured to print a character on a printing medium, a display including multiple individual display areas arranged in a particular order and a controller, the recording medium storing computer-readable instructions,
   wherein the instructions, when executed by the controller, cause the printing apparatus to:
      display one of a character image and an icon on each of the multiple individual display areas, the character image being an image indicating the character, the icon corresponding to a control code indicating a process related to a print control of a character;
      obtain characters and control codes sequentially in accordance with an order in which the icons and the character images are arranged in the multiple individual display areas;
      when control codes indicating different processes are obtained, execute processes indicated by the control codes in accordance with an order corresponding to the order in which the control codes are obtained; and
      control printing performed by the printer based on the control codes and the characters indicated by the character images.

6. A method of controlling a printing apparatus, the printing apparatus including a printer configured to print a character on a printing medium, a display including multiple individual display areas arranged in a particular order,
   wherein the method comprises:
      displaying one of a character image and an icon on each of the multiple individual display areas, the character image being an image indicating the character, the icon corresponding to a control code indicating a process related to a print control of a character;
      obtaining characters and control codes sequentially in accordance with an order in which the icons and the character images are arranged in the multiple individual display areas;
      when control codes indicating different processes are obtained, executing processes indicated by the control codes in accordance with an order corresponding to the order in which the control codes are obtained; and controlling printing performed by the printer based on the control codes and the characters indicated by the character images.

\* \* \* \* \*